United States Patent [19]

Porter

[11] Patent Number: 4,907,553
[45] Date of Patent: Mar. 13, 1990

[54] SPEED CONTROL CABLE ATTACHMENT
[75] Inventor: David L. Porter, Westland, Mich.
[73] Assignee: Ford Motor Company, Dearborn, Mich.
[21] Appl. No.: 288,595
[22] Filed: Dec. 22, 1988
[51] Int. Cl.⁴ ................ F02D 7/00; B60K 31/06; F16D 31/02
[52] U.S. Cl. ................... 123/400; 180/175; 60/431
[58] Field of Search ............ 123/400, 401, 361, 399, 123/339, 352; 180/175, 176, 178, 179, 147; 60/431

[56] References Cited

U.S. PATENT DOCUMENTS

| | | | |
|---|---|---|---|
| 4,212,272 | 7/1980 | Hawk | 123/339 |
| 4,615,409 | 10/1986 | Kupper et al. | 180/176 |
| 4,655,180 | 3/1987 | Bauer et al. | 123/361 |
| 4,703,823 | 11/1987 | Yogo et al. | 180/197 |
| 4,747,380 | 5/1988 | Ejiri et al. | 123/399 |
| 4,759,184 | 7/1988 | Kita | 60/431 |
| 4,798,258 | 6/1989 | Otteson | 180/175 |

FOREIGN PATENT DOCUMENTS 0215932 12/1984 Japan ................ 123/400

Primary Examiner—Raymond A. Neill
Attorney, Agent, or Firm—Allan J. Lippa; Peter Abolins

[57] ABSTRACT

A cable attachment assembly for coupling and uncoupling a cable to a throttle control system partially encased within a housing. The housing includes an opening aligned with a cable drum and a protrusion adjacent the opening. A cable cover assembly includes an integrally formed collar having a resilient member formed thereon with a first flap at its end. A second flap is integrally formed on the collar adjacent the first flap. During rotation in an assembly process, the resilient member is compressed as the first flap rotates along the protrusion. As the first flap passes the protrusion, the resilient member is outwardly deflected thereby locking the protrusion between the first and second flaps and, accordingly, locking the cable cover assembly to the housing.

14 Claims, 3 Drawing Sheets

SPEED CONTROL CABLE ATTACHMENT

BACKGROUND OF THE INVENTION

The field of the invention relates to cable attachment assemblies for attaching a cable during an assembly process. In a particular aspect of the invention, the field relates to a cable attachment assembly for an engine throttle control system.

In automobile applications in particular, a control system having a cable pulley is connected to the engine throttle by a cable such as a Bowden-cable. Examples of such control systems include speed control systems, drive-by wire systems, wheel slip control systems, and throttle return systems. Speed control systems are well known for controlling the engine throttle plate via a cable attached to a cable pulley. In a typical speed control system, a servo motor is coupled to the cable pulley through a gearing system and electromagnetic clutch. Rotational movement of the servo motor is coupled to the cable pulley, and accordingly throttle plate, for maintaining a desired speed in response to an electronic controller or microcomputer.

Portions of the control system are usually contained within a relatively tight housing with the cable pulley positioned external to the housing. During assembly, the cable is threaded into the cable pulley and a cover assembly attached over the cable pulley with fasteners such as machine screws. A relatively tight seal is needed to prevent degradation of the control system by contaminants in the engine compartment.

The inventors herein have recognized numerous problems and disadvantages with these assembly approaches. Prior approaches are labor intensive which is particularly disadvantageous in mass production environments. Further, the mechanical manipulations required to attach the cover assembly may result in a pinched cable and possible operational failure.

SUMMARY OF THE INVENTION

It is a object of the invention described herein to provide a cable attachment assembly for a throttle control system which requires fewer assembly steps, fewer components, and less chance for assembly error than heretofore possible.

The problems and disadvantages of prior approaches are overcome, and object achieved, by providing a cable attachment assembly for coupling a cable to a throttle control system partially encased within a housing. In one particular aspect of the invention, the cable attachment assembly comprises: a cable drum rotatably coupled to the housing and positioned in alignment within an opening of the housing; a protrusion positioned on the housing adjacent the housing opening; a cover having a substantially cylindrical casing adapted for coupling to the housing opening, the cover including a cable guide for guiding the cable therethrough to the drum; and attachment means coupled to the casing for interlocking with the protrusion when the casing is rotated against the housing during an assembly process, the attachment means including, a resilient member extending from the casing having a first flap positioned thereon, and a second flap coupled to the casing and spatially separated from first flap for accepting the protrusion therebetween.

An advantage of the above described aspect of the invention is that the cable attachment assembly is locked securely to the housing by simple manual rotation. No fastening devices or special tools are required. Similarly, the cable attachment assembly may be decoupled from the housing by simple manual rotation in an opposing direction.

In another aspect of the invention the cable attachment assembly comprises: a cable drum rotatably coupled to the housing and positioned in alignment with an opening in the housing, the cable drum comprising, a disk having a notch, a partial circumferential groove, a channel extending from the notch to an outer circumferential surface of the disk, a deflectable member along the channel, and a cut along an outer planar surface exposing a portion of the groove adjacent to the channel; a cable cover having a substantially cylindrical casing adapted for coupling to the housing opening, the cable cover including a cable guide adapted for guiding the cable therethrough; the cable having a nipple at one end for insertion into the channel and interlocking with the deflectable member, the cable extending from the channel along the exposed groove and then along the groove after insertion; a protrusion positioned on the housing adjacent the opening; and attachment means coupled to the casing for locking with the protrusion when the cable cover is rotated against the housing during an assembly process.

An advantage of the above aspect of the invention is that the cable is interlocked with the cable drum by simple manual insertion. Another advantage is that the configuration described, including the cut in the cable disk, greatly reduces any chance of crimping the cable during placement of the cable cover. For example, if the cable moves over the planar surface of the disk during assembly, movement of the casing should slide the cable into the groove through the cut portion thereby preventing any crimping. Still another advantage is that the cable cover is locked securely to the housing by simple manual rotation. No fastening devices or special tools are required.

BRIEF DESCRIPTION OF THE DRAWINGS

The objects advantages described herein will be more fully understood by reading the description of the preferred embodiments with reference to the drawings wherein.

DESCRIPTION OF THE PREFERRED EMBODIMENT

Figure 1A:
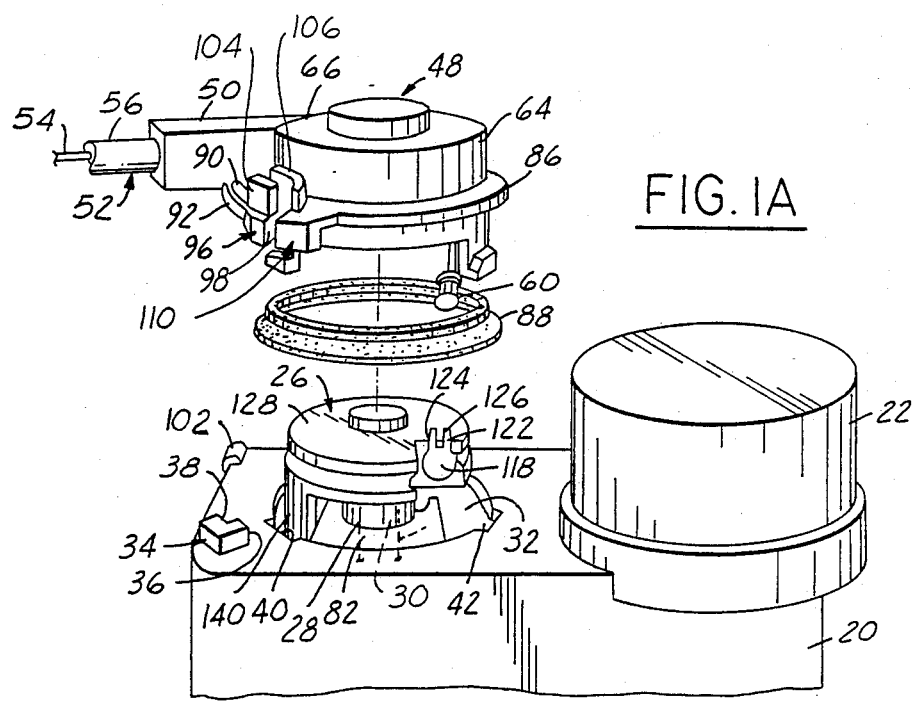
FIG. 1A is a perspective view of an embodiment in which the invention is used to advantage.

The invention claimed herein may be better understood by reviewing a description of one of many embodiments in which the invention may be used to advantage. An example of one embodiment is presented herein with reference to the attached drawings. Referring in general terms to FIG. 1A, a perspective view of housing 20 is shown encasing a portion of a throttle control system. In this particular example, the throttle control system is a speed control system which includes servo motor 22 coupled to cable drum 26 via a conventional gearing assembly (not shown) and electromagnetic clutch (not shown) connected to rotating shaft 30 via hub 28. Housing 20 is shown including extension 34 having rest stop 38 and protrusion 36 positioned adjacent housing opening 32. Slots 40, 42, and 44 are shown extending outwardly in a radial direction from housing opening 32.

Cable drum 26, preferably molded from a plastic material such as nylon, is shown fixedly connected to shaft 30 and aligned with housing opening 32. Shaft 30 is partially held in place by extension 82 of housing 20. Cable cover assembly 48, preferably molded from a plastic material such as nylon, is shown including cable guide 50 connected to Bowden-cable 52 which includes steel cable 54 inserted within sleeve 56. Cable 54 is connected at one end to the engine throttle plate (not shown) and at its opposing end to nipple 60 for insertion into cable drum 26. As described in greater detail hereinafter, cable cover assembly 48 is structured for manual insertion over cable drum 26 into housing opening 32 and interlocking with housing 20 upon manual rotation.

Figure 1B:
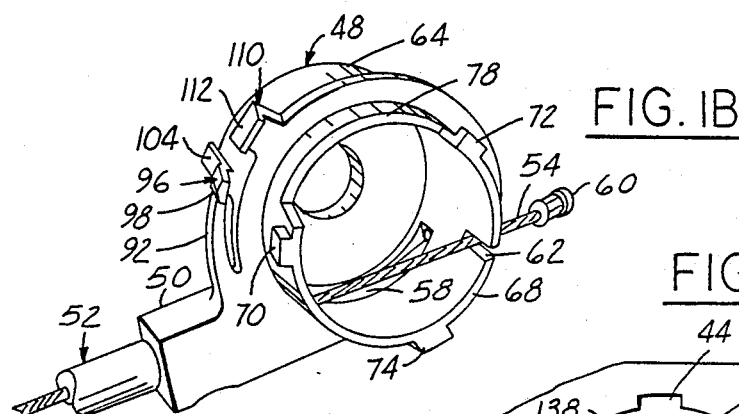
FIG. 1B is a partially rotated perspective view of a portion of the embodiment shown in FIG. 1A.

Cable cover assembly 48 is now described in greater detail with reference to FIG. 1B and continuing reference to FIG. 1A. FIG. 1B is a rotated perspective view of cable cover assembly 48 shown with cable 54 inserted through trough 58. Cable 54 is also shown inserted into storage slot 62 to facilitate transportation and storage before assembly. Cable cover assembly 48 includes substantially cylindrical casing 64 having closed end 66 and open end 68. Tabs 70, 72, and 74 are shown integrally formed from cylindrical casing 64 and extending from open end 68 to align with respective slots 40, 42, and 44 of housing 20 during assembly. Cylindrical casing 64 is also shown having recess 78 along open end 68 for alignment with extension 82 of housing 20.

Collar 86 in this example is integrally formed from cylindrical casing 64 around a portion of its circumferential surface. When cable cover assembly 48 is mated to housing 20, collar 86 and ring seal 88 operate to seal housing opening 20. Ring seal 88 is a conventional seal constructed in this example from synthetic rubber.

Gap 90 is shown formed in collar 86 to form flexible or resilient member 92 along a portion of the outer periphery of collar 86. Flap 96 is shown in this example as being integrally formed from resilient member 92 and positioned at its outer end. For reasons described hereinafter, resilient member 92 and flap 96 are shown gradually increasing in width from the junction of resilient member 92 with collar 86. Upwardly extending Portion 104 of flap 96 is integrally formed from resilient member 92 for providing a lever to manually compress resilient member 92 by an assembler or repair technician. Collar 86 also includes integrally formed upwardly extending portion 106 which acts as a rest stop during compression of resilient member 92. Flap 110 is shown integrally formed from collar 86 and spatially separated from flap 96 for accepting protrusion 36 therebetween (FIGS. 4 and 5) during the assembly process described below.

Figure 2:
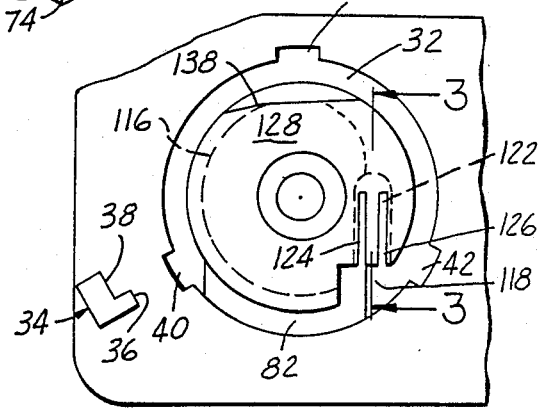
FIG. 2 is a top view of a portion of the embodiment shown in FIG. 1A.
Figure 3:
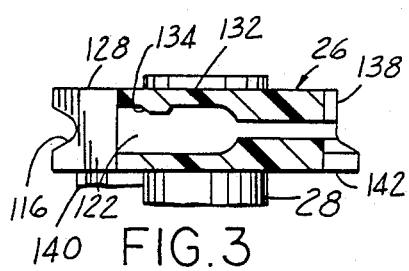
FIG. 3 is a cross-sectional view taken along lines 3—3 of FIG. 2.
Figure 4:
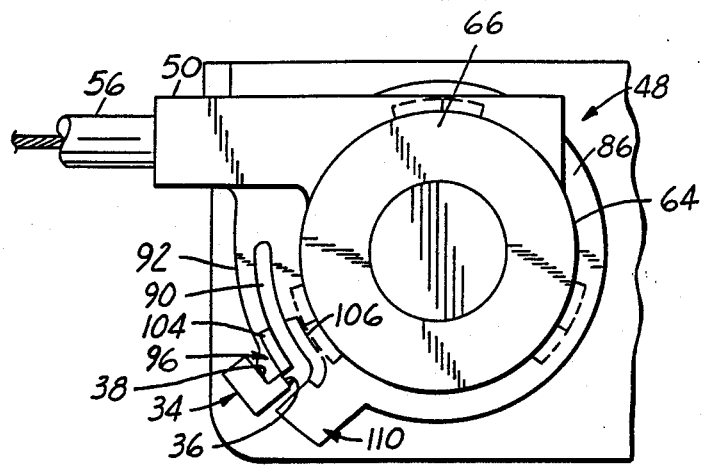
FIG. 4 is a top view of a cable attachment assembly shown in the locked position.
Figure 5:
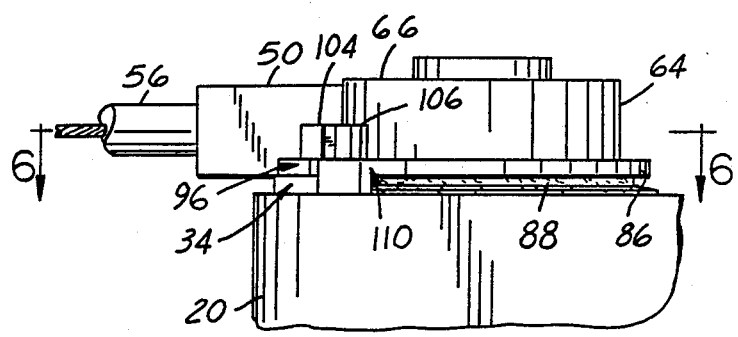
FIG. 5 is a side elevation view of the cable attachment assembly shown in FIG. 4.

Cable drum 26 is now described in greater detail with reference to FIGS. 2, 3, and 4 and continuing reference to FIG. 1A. More specifically, cable drum 26 is shown as a disk having partial circumferential groove 116 and notch 118 formed through a portion of the circumference. Channel 122 extends from notch 118 longitudinally into a portion of cable drum 26 such that channel 122 is open on one longitudinal side (FIG. 3) for accepting lateral insertion of cable 54 as described hereinafter. Parallel grooves 124 and 126 are formed through top planar surface 128 of cable drum 26 onto channel 122 thereby forming deflectable member 132 between grooves 124 and 126. Deflectable member 132 is shown formed with downwardly extending tongue 134 for securing nipple 60 of steel cable 54. Cut 138 is formed through top planar surface 128 and groove 116 to prevent pinching of cable 54 during assembly as described hereinafter. Bottom drum surface 142 of cable drum 26 includes downward extension 140 for limiting rotation of cable drum 26. More specifically, downward extension 140 abuts against housing extension 82 when cable drum 26 is rotated a predetermined amount as determined by constraints of the throttle control system utilized in a particular application.

Figure 6:
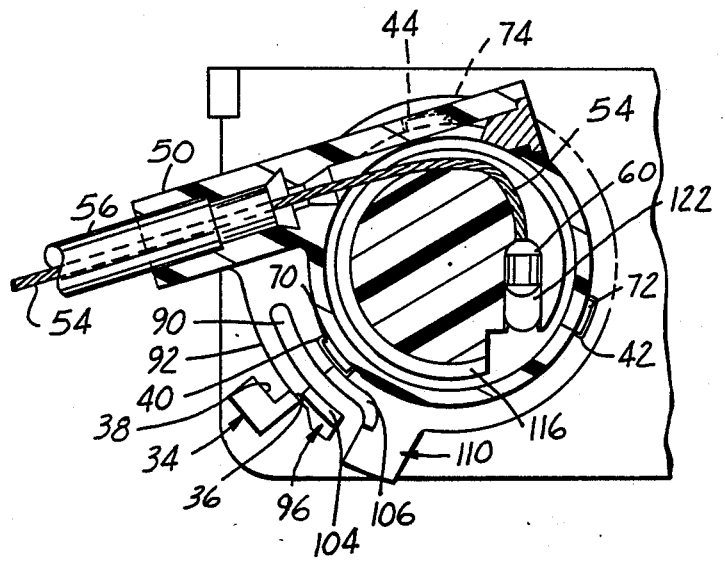
FIG. 6 is a cross-sectional view taken along lines 6—6 in FIG. 5 with the cable attachment assembly rotated to an unlocked position.

The operation of locking cable assembly 48 onto housing 20 and inserting cable 54 into cable drum 26 is now described with reference to FIG. 4–8. Cable cover assembly 48 is shown locked onto housing 20 with protrusion 36 locked between tabs 96 and 110 in FIGS. 4 and 5. Referring to FIG. 6, a partial cross-sectional view of cable cover assembly 48 is shown exposing cable drum 26 and rotated into the locked position. During assembly cable 54 is first laterally inserted through the open longitudinal side of channel 122 and pulled toward cable guide 50. Nipple 60 is thereby forced from notch 118 into channel 122 against deflectable member 132. Thereafter, nipple 60 is held in place by tension from deflectable member 132 and tongue 134. Cable cover assembly 48 is then inserted into housing 20 such that tabs 70, 72, and 74 of cable cover assembly 48 are inserted through respective slots 40, 42, and 44 of housing 20. During insertion, cable 54 is forced overcut 138 and against groove 116. In this position, resilient member 92 is in its normal position resting against protrusion 36.

Figure 7:
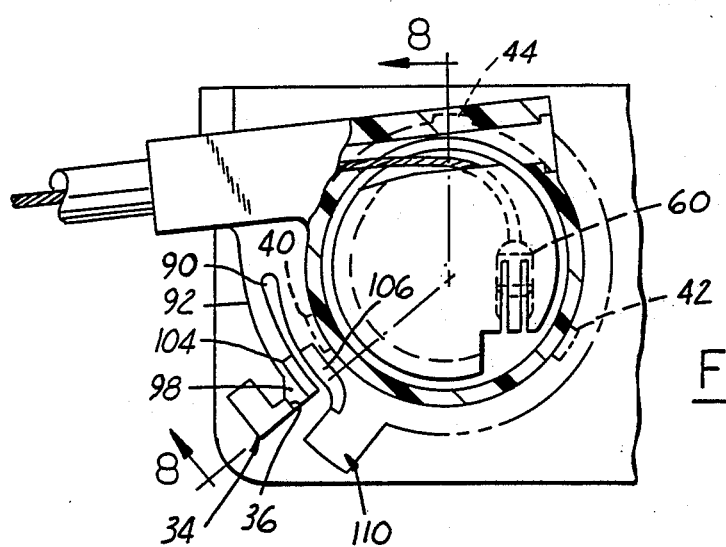
FIG. 7 is a view of the cable cover attachment assembly shown in FIG. 6 rotated towards the locked position.
Figure 8:
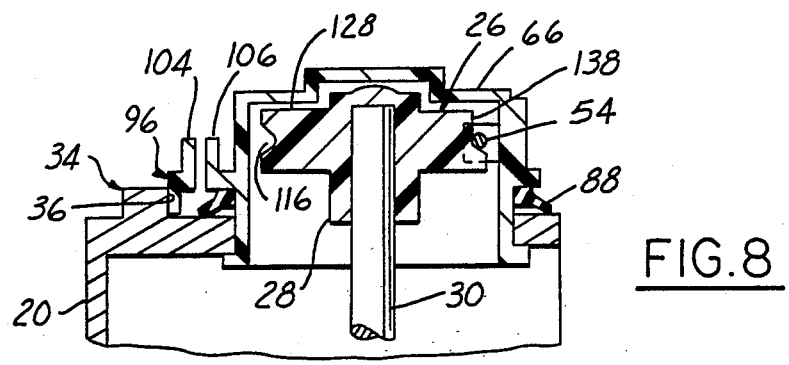
FIG. 8 is a cross-sectional view taken along lines 8—8 in FIG. 7.

As cable cover assembly 48 is rotated clockwise by the assembler, the widened portion of resilient member 92 and flap 96 are forced against protrusion 36. The resulting reactive force pushes resilient member 92 and flap 96 inwardly as shown in FIG. 7 and the corresponding cross-sectional view in FIG. 8. Concurrently, tabs 70, 72, and 74 of cable cover assembly 48 are rotated under housing 20 from respective housing slots 40, 42, and 44. The reactive force between housing 20 and tabs 70, 72, and 74 seats collar 86 and ring seal 88 against housing 20.

With further rotation of cable cover assembly 48, flap 96 is rotated past protrusion 36 such that resilient member 92 and flap 96 deflect outwardly against rest stop 38, and flap 110 abuts against protrusion 36. As shown in FIG. 4 and the corresponding side elevation view in FIG. 5, protrusion 36 is then locked between flaps 96 and 110. Accordingly, cable cover assembly 48 is locked in place against housing 20 and restricted from further rotation.

To remove cable cover assembly 48, the assembler pushes against upwardly extending member 104, thereby compressing resilient member 92, and rotates cable cover assembly 48 in a counterclockwise direction. Flap 96 is then rotated past protrusion 36. Rotation continues until tabs 70, 72, and 74 are aligned with respective housing slots 40, 42, and 44 whereupon cable cover assembly 48 may be removed.

This concludes the description of the preferred embodiment. The reading of it by those skilled in the art will bring to mind many modifications and variations of the embodiment described herein without departing from the spirit and scope of the invention. For example, the invention may be used to advantage in other applications wherein it is desired to attach a cable to a housing such as, for example, drive-by wire systems. Accordingly, it is intended that the invention be limited only by the following claims.

What is claimed:

1. A cable attachment assembly for coupling a cable to a control system partially encased within a housing, comprising:
   a cable drum rotatably coupled to said housing and positioned in alignment with an opening of said housing;
   a protrusion of said housing adjacent said opening;
   a cover having a substantially cylindrical casing adapted for coupling to said housing opening, said cable cover including a cable guide for guiding the cable therethrough to said drum; and
   attachment means coupled to said casing for locking with said protrusion when said cable cover is rotated against said housing during an assembly process.

2. The cable attachment assembly recited in claim 1 wherein said cover and said attachment means are integrally formed from the same plastic material.

3. The cable attachment assembly recited in claim 1 wherein the cable comprises a Bowden-cable.

4. A cable attachment assembly for coupling a cable to a control system partially encased within a housing, comprising:
   a cable drum rotatably coupled to said housing and positioned in alignment with an opening of said housing;
   a protrusion positioned on said housing adjacent said housing opening;
   a cable cover having a substantially cylindrical casing adapted for coupling to said housing opening, said cable cover including a cable guide for guiding the cable therethrough to said drum; and
   attachment means coupled to said casing for interlocking with said protrusion when said casing is rotated against said housing during an assembly process, said attachment means including, a resilient member extending from said casing having a first flap positioned thereon, and a second flap coupled to said casing and spatially separated from first flap for accepting said protrusion therebetween.

5. The cable attachment assembly recited in claim 4 wherein said cylindrical casing and said resilient member and said first flap and said second flap are integrally formed from the same plastic material.

6. The cable attachment assembly recited in claim 4 wherein said cylindrical casing further comprises a storage slot for securing said cable during transportation and storage.

7. A cable attachment assembly for coupling a throttle cable to a throttle control system, comprising:
   a housing encasing the throttle control system, said housing having a substantially round opening and a plurality of slots radially extending from said opening into said housing;
   a protrusion extending from said housing adjacent said opening;
   a cable drum rotatably coupled to said housing and aligned with said housing opening;
   a cable cover having a substantially cylindrical casing and a cable guide for coupling to a Bowden cable, said casing having an open end with a plurality of outwardly extending radial tabs adapted to align with said housing slots; and
   attachment means coupled to said casing for interlocking with said protrusion when said casing is rotated against said housing during an assembly process, said attachment means including, a collar attached to said casing having a flexible member with a first tab extending therefrom such that said flexible member becomes compressed by said protrusion during said rotation thereby enabling said first flap to pass by said protrusion and thereafter deflect outwardly, and a second flap radially extending from said collar and spatially separated by said first flap for accepting said protrusion therebetween.

8. The cable attachment assembly recited in claim 7 wherein said cylindrical casing and said collar and said resilient member and said first flap and said second flap and said plurality of outwardly extending tabs are integrally formed from the same plastic material.

9. The cable attachment assembly recited in claim 7 wherein said flexible member is defined by a gap formed through a portion of said collar.

10. The cable attachment assembly recited in claim 7 further comprising a ring seal for placement between said collar and said housing.

11. The cable attachment assembly recited in claim 7 wherein said first tab further comprises an upwardly extending member responsive to manual depression by an assembler for compression of said resilient member during assembly.

12. A cable attachment assembly for coupling and uncoupling a throttle cable to a throttle control system partially encased within a housing comprising:
    a cable drum rotatably coupled to said housing and positioned in alignment with an opening in said housing, said cable drum comprising, a disk having a notch, a partial circumferential groove, a channel extending from said notch to an outer circumferential surface of said disk, a deflectable member along said channel, and a cut along an outer planar surface exposing a portion of said groove adjacent to said channel;
    a cable cover having a substantially cylindrical casing adapted for coupling to said housing opening, said cable cover including a cable guide adapted for guiding the cable therethrough;
    said cable having a nipple at one end for insertion into said channel and interlocking with said deflectable members, said cable extending from said channel along said exposed groove and then along said groove after insertion;

a protrusion positioned on the housing adjacent said opening; and attachment means coupled to said casing for locking with said protrusion when said cable cover is rotated against said housing during an assembly process.

13. The cable attachment assembly recited in claim 12 wherein said attachment means further comprises:

a resilient member extending from said casing having a first flap positioned thereon; and a second flap coupled to said casing and spatially separated from first flap for accepting said protrusion therebetween.

14. The cable attachment assembly recited in claim 12 wherein said casing and said attachment means are integrally formed from the same plastic material.

* * * * *